(12) United States Patent  
Wai

(10) Patent No.: US 8,185,095 B2
(45) Date of Patent: May 22, 2012

(54) METHOD AND APPARATUS FOR TRACKING VERSION OF DIGITAL CONTENT

(75) Inventor: King Sun Wai, Castro Valley, CA (US)

(73) Assignee: mSpot, Inc., Palo Alto, CA (US)

( * ) Notice: Subject to any disclaimer, the term of this patent is extended or adjusted under 35 U.S.C. 154(b) by 1025 days.

(21) Appl. No.: 11/810,828

(22) Filed: Jun. 6, 2007

(65) Prior Publication Data

US 2008/0305777 A1 Dec. 11, 2008

(51) Int. Cl.
*H04M 3/42* (2006.01)
*H04M 3/00* (2006.01)
*H04B 1/38* (2006.01)
*G06F 15/16* (2006.01)

(52) U.S. Cl. ............... 455/414.1; 455/419; 455/557; 709/236

(58) Field of Classification Search .......... 455/414.1, 455/557, 419, 420, 466; 709/236
See application file for complete search history.

(56) References Cited

U.S. PATENT DOCUMENTS

| | | | |
|---|---|---|---|
| 6,088,706 A | | 7/2000 | Hild |
| 6,401,113 B2 * | | 6/2002 | Lazaridis et al. ............. 709/207 |
| 6,719,918 B2 * | | 4/2004 | Lee et al. ............. 216/79 |
| 6,741,980 B1 | | 5/2004 | Langseth et al. |
| 7,007,064 B2 * | | 2/2006 | Faris ............. 709/203 |
| 7,162,223 B2 * | | 1/2007 | Kamat ............. 455/412.1 |
| 7,337,218 B2 * | | 2/2008 | Arnold ............. 709/217 |
| 7,346,630 B2 * | | 3/2008 | Eichstaedt et al. ............. 1/1 |
| 7,356,332 B2 * | | 4/2008 | Pell et al. ............. 455/414.1 |
| 7,377,693 B2 * | | 5/2008 | Tsai et al. ............. 384/45 |
| 7,444,143 B2 * | | 10/2008 | Deo et al. ............. 455/419 |
| 7,502,634 B2 * | | 3/2009 | Chi ............. 455/566 |
| 7,643,825 B2 * | | 1/2010 | Fritsch et al. ............. 455/422.1 |
| 2002/0090934 A1 * | | 7/2002 | Mitchelmore ............. 455/412 |
| 2003/0224760 A1 * | | 12/2003 | Day ............. 455/412.1 |
| 2004/0077340 A1 * | | 4/2004 | Forsyth ............. 455/414.1 |
| 2004/0110490 A1 * | | 6/2004 | Steele et al. ............. 455/412.1 |
| 2004/0185834 A1 * | | 9/2004 | Sommers et al. ............. 455/414.1 |
| 2004/0198331 A1 * | | 10/2004 | Coward et al. ............. 455/414.1 |
| 2004/0259598 A1 * | | 12/2004 | Wagner et al. ............. 455/566 |
| 2008/0104269 A1 * | | 5/2008 | Vitanov et al. ............. 709/236 |

OTHER PUBLICATIONS

International Search Report, PCT/US08/07064, Aug. 4, 2008.
Written Opinion, PCT/US08/07064, Aug. 4, 2008.
PCT/US2008/007064 International Preliminary Report dated Dec. 7, 2009.

* cited by examiner

*Primary Examiner* — Dwayne Bost
*Assistant Examiner* — Larry Sternbane
(74) *Attorney, Agent, or Firm* — DLA Piper LLP (US)

(57) ABSTRACT

A system and method for live data versioning is provided.

21 Claims, 9 Drawing Sheets

| Game ID | Home Team | Visiting Team | Home Score | Visiting Score | Time | Quarter | SEQ |
|---|---|---|---|---|---|---|---|
| 1 | OAK | NYJ | 0 | 0 | 15 | 1 | 160 |
| 2 | PIT | TEN | 0 | 0 | 15 | 1 | 161 |
| 3 | ARIZ | SF | 0 | 0 | 15 | 1 | 162 |
| 4 | ATL | NYG | 0 | 0 | 15 | 1 | 163 |
| 5 | TB | DEN | 0 | 0 | 15 | 1 | 164 |
| 6 | DAL | WASH | 0 | 0 | 15 | 1 | 165 |

FIGURE 5A

| Game ID | Home Team | Visiting Team | Home Score | Visiting Score | Time | Quarter | SEQ |
|---|---|---|---|---|---|---|---|
| 1 | OAK | NYJ | 0 | 7 | 10:15 | 1 | 166 |
| 2 | PIT | TEN | 0 | 0 | 15 | 1 | 161 |
| 3 | ARIZ | SF | 0 | 0 | 15 | 1 | 162 |
| 4 | ATL | NYG | 0 | 0 | 15 | 1 | 163 |
| 5 | TB | DEN | 0 | 0 | 15 | 1 | 164 |
| 6 | DAL | WASH | 0 | 0 | 15 | 1 | 165 |

FIGURE 5B

| Game ID | Home Team | Visiting Team | Home Score | Visiting Score | Time | Quarter | SEQ |
|---|---|---|---|---|---|---|---|
| 1 | OAK | NYJ | 0 | 7 | 10:15 | 1 | 166 |
| 2 | PIT | TEN | 3 | 0 | 2:00 | 1 | 167 |
| 3 | ARIZ | SF | 0 | 0 | 15 | 1 | 162 |
| 4 | ATL | NYG | 0 | 0 | 15 | 1 | 163 |
| 5 | TB | DEN | 0 | 0 | 15 | 1 | 164 |
| 6 | DAL | WASH | 0 | 0 | 15 | 1 | 165 |

| Game ID | Home Team | Visiting Team | Home Score | Visiting Score | Time | Quarter | SEQ |
|---|---|---|---|---|---|---|---|
| 1 | OAK | NYJ | 3 | 7 | 4:00 | 1 | 168 |
| 2 | PIT | TEN | 3 | 0 | 2:00 | 1 | 167 |
| 3 | ARIZ | SF | 0 | 0 | 15 | 1 | 162 |
| 4 | ATL | NYG | 0 | 7 | 12:12 | 1 | 169 |
| 5 | TB | DEN | 0 | 0 | 15 | 1 | 164 |
| 6 | DAL | WASH | 0 | 0 | 15 | 1 | 165 |

| Game ID | Time | SEQ |
|---|---|---|
| 1 | 10:15 | 201 |
| 2 | 12:01 | 230 |
| 3 | 15 | 167 |
| 4 | 15 | 168 |
| 5 | 15 | 169 |
| 6 | 15 | 170 |

| Game ID | Home Score | SEQ |
|---|---|---|
| 1 | 0 | 300 |
| 2 | 7 | 404 |
| 3 | 0 | 302 |
| 4 | 0 | 303 |
| 5 | 0 | 304 |
| 6 | 0 | 305 |

| KEY | DATA | SEQ NUMBER |
|---|---|---|
| Touchdowns | 0 | 210 |
| Yards Passing | 0 | 211 |
| Interceptions | 0 | 212 |
| . | . | . |
| . | . | . |
| Yards Passing | 260 | 230 |
| Touchdowns | 3 | 231 |
| Interceptions | 1 | 232 |

FIGURE 8

METHOD AND APPARATUS FOR TRACKING VERSION OF DIGITAL CONTENT

FIELD

A system and method for tracking data updates to digital content delivered to a plurality of mobile handsets.

BACKGROUND

The World Wide Web and its graphical interface have become widely popular. During the start of the World Wide Web, people used computing devices, such as personal computers and the like with processors, large displays, etc. to browse the web sites that made up the World Wide Web. More recently, cellular phone, mobile devices and other integrated processing based devices have the ability to browse the web sites of the World Wide Web. This allows any person with a mobile phone, etc. to browse these web sites.

Some of these web sites contain "live" data that is constantly updated, such as for example sports scores or stock prices, so that it is necessary to continuously update the devices that are receiving that live data. With typical processing unit based devices, this is done using a database and the entire website is refreshed when a refresh occurs. For computing devices with reasonably fast communications links, the refresh of the entire web page is acceptable. However, in the mobile device arena (due to limitations of the mobile device and the more limited bandwidths at which these mobile devices communicate), it is not feasible to update the entire web site when a piece of data on the website changes and another mechanism for updating the pieces of data in a website delivered to a mobile device is needed and it is to this end that the system is directed.

BRIEF DESCRIPTION OF THE DRAWINGS

FIGS. 5A-5D illustrate an example of a first embodiment of the live data data structure of the live data versioning system;

FIG. 8 illustrates an example of a third embodiment of a live data data structure of the live data versioning system.

DETAILED DESCRIPTION OF ONE OR MORE EMBODIMENTS

The embodiments described below are merely illustrative of the system and method. The simple example of the live data used to describe these embodiments is a sports site that has live football scores. However, the live data versioning system and method may be used with any type of live data and can be used with web sites that have hundreds or thousands of pieces of live data that are continuously updated. For example, the system may be used for financial live data (stock prices, etc.), different sports data or any other data which needs to be continuously updated. The example of the mobile device used to illustrate the system will be a digital data enabled cellular phone, but the system may be used with any type of mobile device. A data structure that is used to implement the system is described below, buy any other data structure may be used to track the live data and the versions of the live data.

Figure 1:
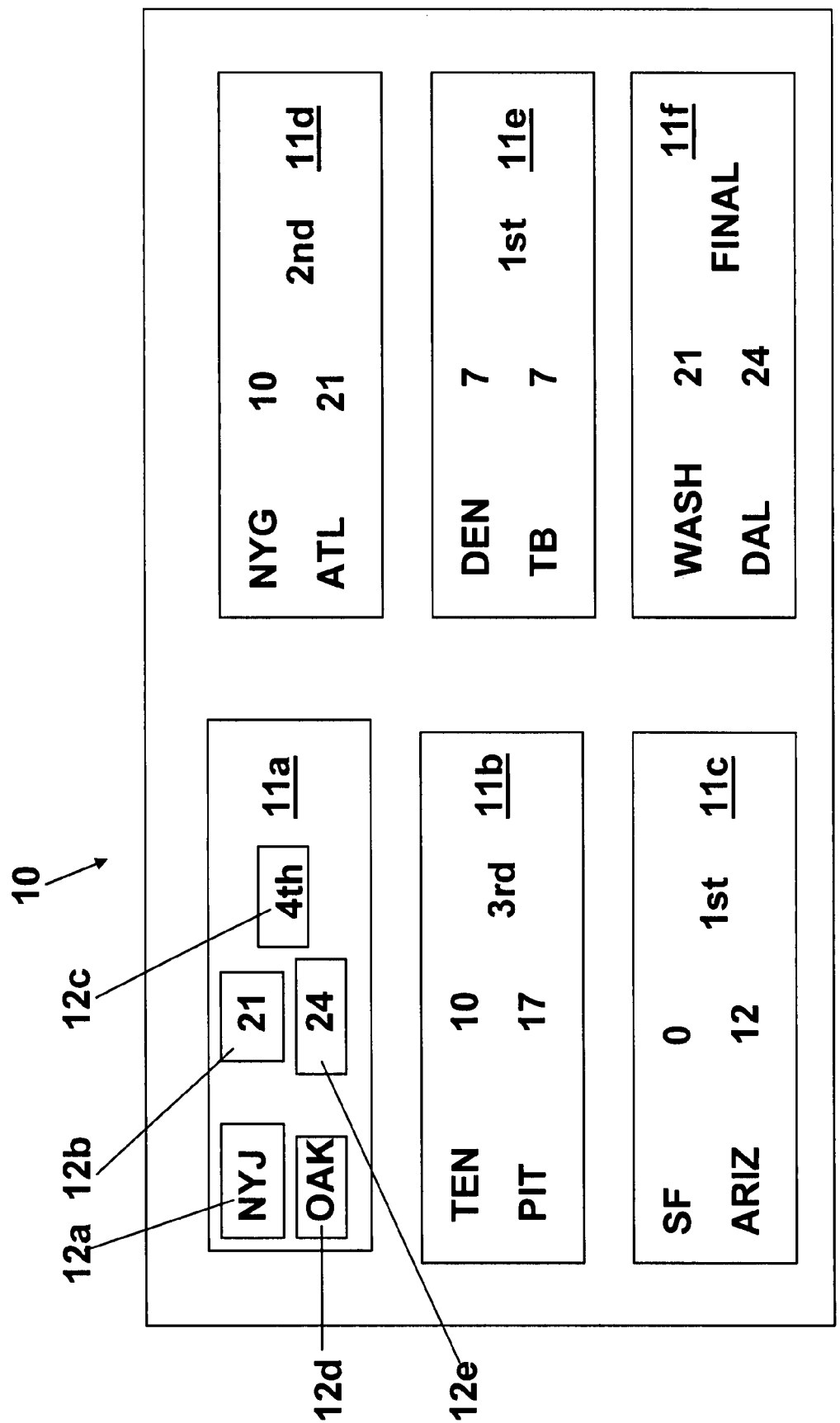
FIG. 1 illustrates an example of a mobile device live data display.

FIG. 1 illustrates an example of a mobile device live data display 10 that may be managed using the live data versioning system described below. In this example, the website is a sports website that provides continuously updated football scores wherein a plurality of piece of events 11a (such as the events 11a-11f shown in FIG. 1) are continuously updated as the scores in the games change. The exemplary website has a limited amount of live data (and likely not all of the live data normally associated with a live update football web site (that may also include the live game time, statistics for each player in each game that may be used to track fantasy football statistics and the like). However, the simple example shown in FIG. 1 does illustrate the benefit of the live data versioning system.

In the context of a mobile device accessing the live data, the display 10 may be a WAP or web page that is downloaded to the mobile device and has been formatted for the particular screen of the mobile device. Alternatively, the mobile device may have an application that is executed by the processing unit of the mobile device and interacts with the live data site, receives the live data and the periodic updates and displays the live data to the user of the mobile device. In the example shown, each event 11 may further comprises a plurality of pieces of live data 12 wherein each piece of data is associated with the event and needs to be updated independently of the other live data so that only the piece of live data that have been updated needs to be sent to the mobile device during an update. In the example in FIG. 1, the pieces of live data for each game may include each team name 12a, 12d, the score for each team (at any particular time during the game) 12b, 12e and the quarter of the game 12c. Using the live data versioning system described below, a mobile device is able to access this display 10 and receive live updated data without having to receive the entire display/WAP site each time that an update occurs.

Figure 2:
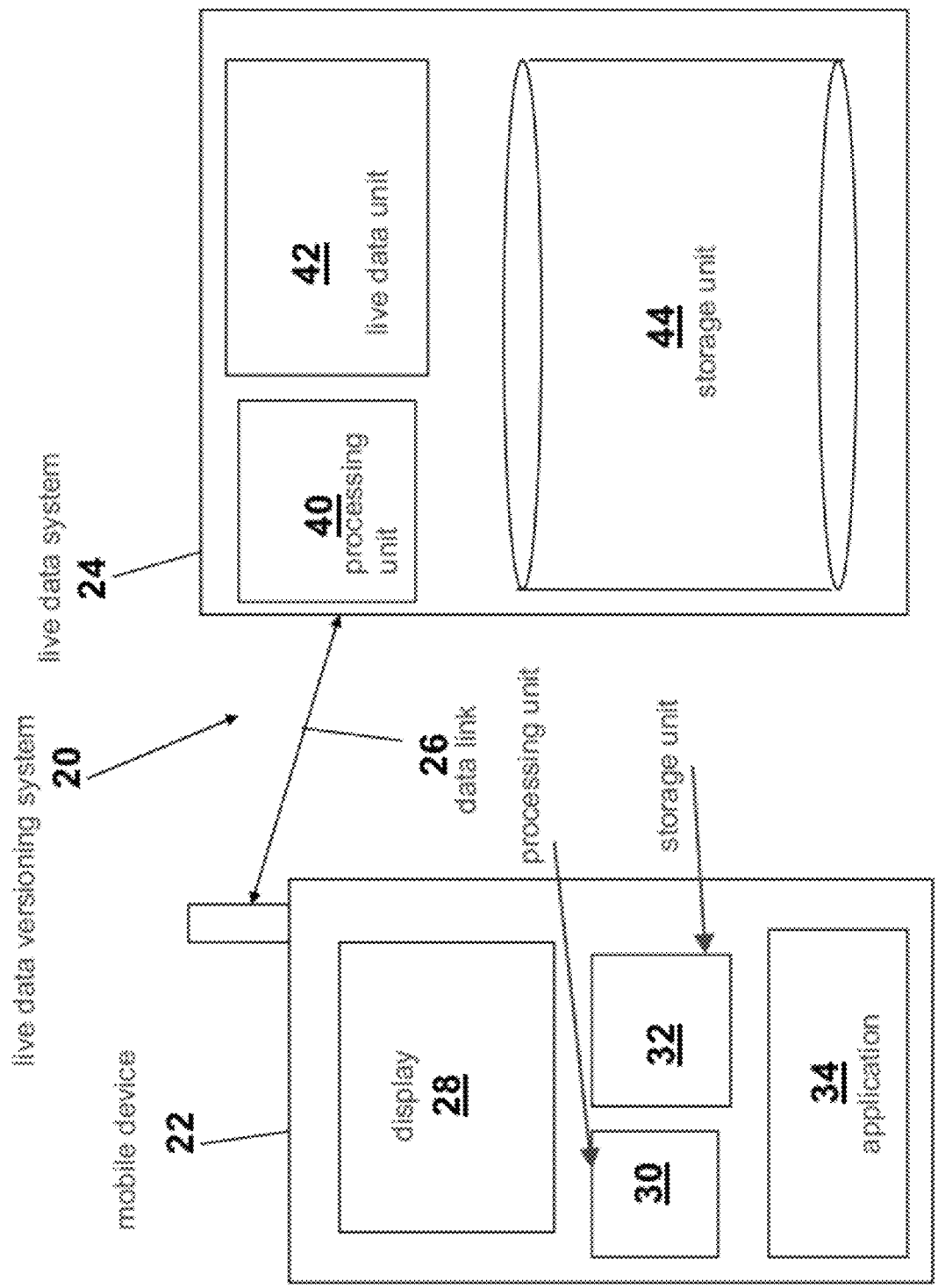
FIG. 2 illustrates an example of a mobile device live data versioning system.

FIG. 2 illustrates an example of a mobile device live data versioning system 20 that may include a mobile device 22 that can access a live data system 24 over a communications or data link 26. In the mobile device example, the communications or data link is a wireless digital data link, such a GPRS or EDGE, etc.) that allows the mobile device to receive digital data over the cellular or mobile device network. When the live data versioning system is operated with other types of mobile devices, the communications link may be communications or data link that is wired or wireless and can operate over any protocol as the live data versioning system is not limited to operation over a particular network protocol.

The mobile device in the example in FIG. 2 is a mobile handset that operates on a cellular network. However, the mobile device 22 may be any processing unit based device with sufficient storage and connectivity to interact with the live data system and receive the live data and the updates. For example, the mobile device 22 may be a PDA, mobile phone or wireless email device (such as the Blackberry). In the example in FIG. 2, a single mobile device is shown for illustration purposes although the live data versioning system may operate when a plurality of mobile devices are all simultaneously accessing and receiving the live data from the live data system. Each mobile device 22 may include a display 28, a processing unit 30, a storage unit 32 and a unit that allows the mobile device to establish a session with the live data system 24. In one embodiment, the mobile device may also have an application 34, executed by the processing unit of the mobile device, that may establish the session with the live data system, exchange data with the live data system, request periodic updates of the live data, format the live data for the particular mobile device and display the live data to the user of the mobile device. The application 34 may be a Java application in one embodiment.

The live data system 24 may be a typical server computer in one embodiment and may have one or more processing units 40 and the other elements normally associated with a server computer and a live data unit 42 that manages the live data, establishes the sessions with the plurality of mobile devices and responds to new live data requests and updated live data requests. In one embodiment, the live data unit may be one or more software applications that has plurality of lines of computer code. The live data system may also include a storage unit 44 associated with the live data unit 42 that stores the live data and provides the live data to the live data unit as needed. In one embodiment, the storage unit may be an SQL database server.

Figure 3:
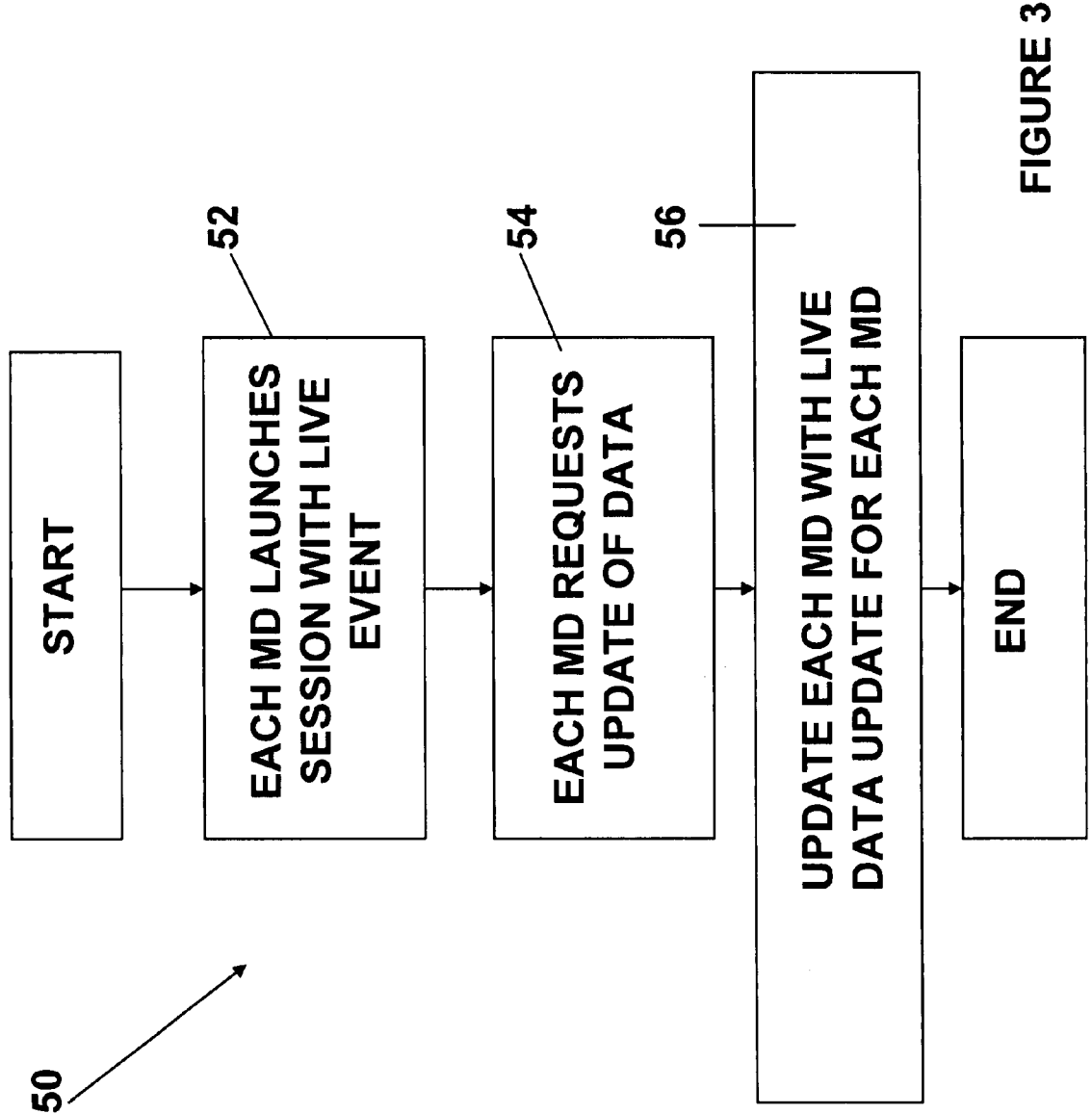
FIG. 3 illustrates a method for mobile device live data versioning.
Figure 4:
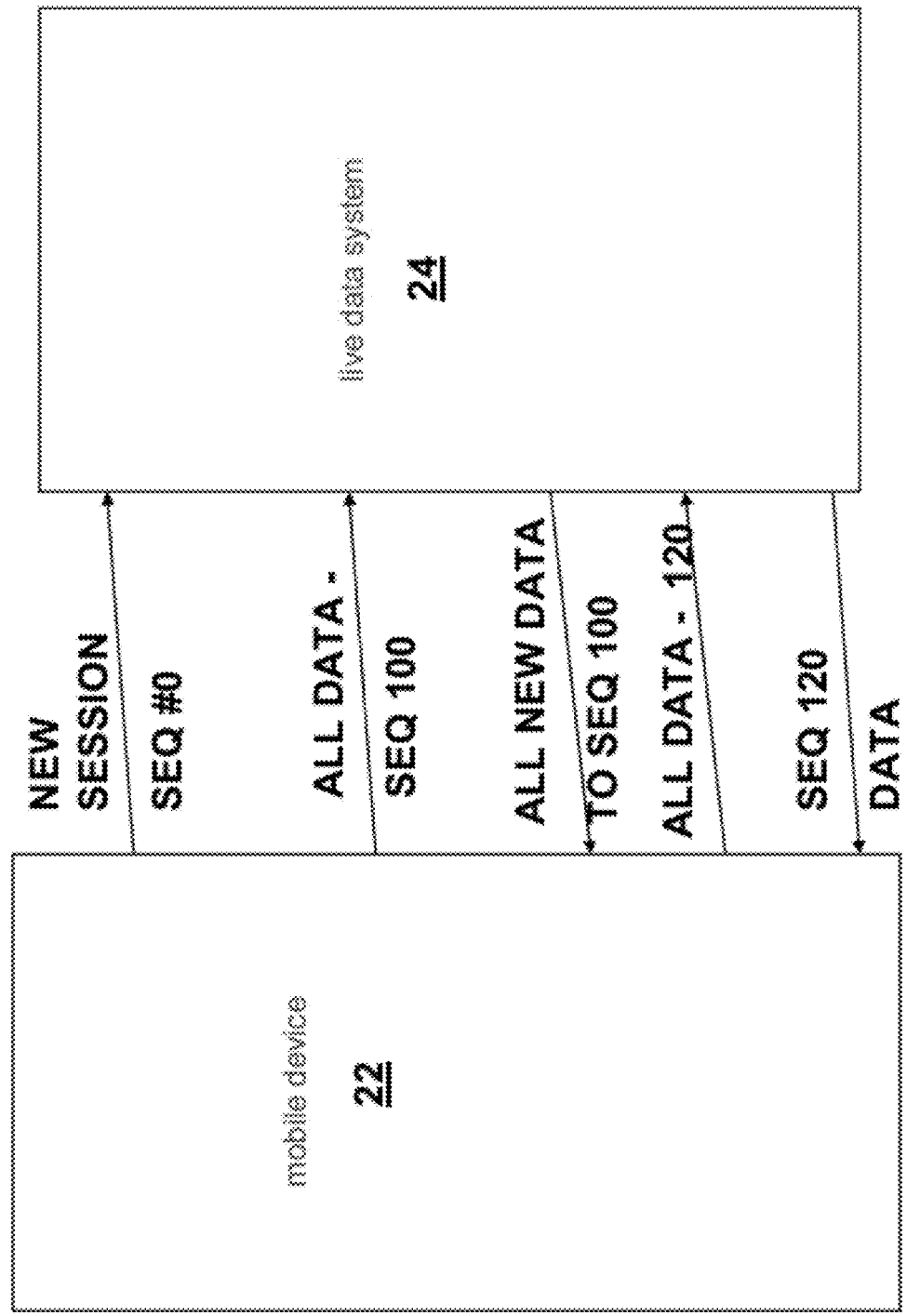
FIG. 4 illustrates the interaction between a mobile device and a live data site during the live data versioning.

FIG. 3 illustrates a method 50 for mobile device live data versioning and FIG. 4 illustrates the interaction between a mobile device and a live data site during the live data versioning. The method of live data versioning will be described using both FIG. 3 and FIG. 4. In the method, each mobile device (MD) may launch a session with the live data unit and system to begin receiving the live data (52). Obviously, each MD does not start its live data session at the same time so that it is necessary to provide each MD with the proper live data when each MD starts its live data session. For example, if a MD starts its session while a particular football game is in the second quarter, the live data versioning system provides that MD with the relevant live data for that game and the MD displays the appropriate live data to the user. For any live data system with multiple pieces of live data, each event/piece of live data is individually tracked and managed. In one embodiment, the live data for the entire display 10 is stored together and then provided to each MD together, but the system may also store the pieces of live data for each event separately. FIG. 4 shows that a particular MD establishes a session and requests the current live data from the live data system. In one embodiment, each piece of live data and its updates are stored in unique sequence numbers (SEQ) so that, for any live data system, the appropriate live data can be delivered to the mobile device. Thus, when the MD first accesses the live data, an SEQ 0 command is sent to the live data system that requests all of the live data on the page. When the particular MD receives the live data, it also receives the last current piece of live data or update. For this example, the last piece of live data has SEQ 100.

Once a particular MD has received the initial live data, it can periodically (due to a timer event occurring or due to user action) ask for any updated live data (54). As shown in FIG. 4, this may be done by requesting all of the live data since the last piece of live data received by the particular MD which is SEQ 100 in this example. The live data system then updates the particular MD (56) with only the updated live data, such as the live data from SEQ 100 to SEQ 120 for example for a particular MD and the live data from SEQ 70-SEQ 120 for a different MD. In this manner, each MD receives the updated live data that is appropriate.

During the term of each live event, the live data system in one embodiment maintains a data structure that stores each piece of live data, each update to each piece of live data and the sequence number associated with each live event. In another embodiment, the live data system maintains a data structure for all of the live events on a display 10 until all of the live events are completed. Then, the data structure may be discarded.

Figure 5C:
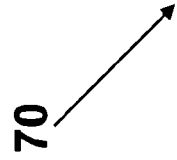
Figure 5D:
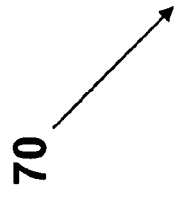

FIGS. 5A-5D illustrate an example of a first embodiment of the live data data structure 70 of the live data versioning system. The data structure shown in FIGS. 5A-5D stored the live data associated with the exemplary display 10 shown in FIG. 1. As shown, all of the live data for each live event (each football game in the example) is stored in the data structure (such as a row of a database table in an SQL database for example) with a live event identifier (the game ID in this example) that is used by the MD to determine which live event is being updated using the pieces of live data so that, for example, only the display for that live event must be generated with the new live data. Each piece of live data (and its value) is then stored in the data structure (a column of a database table in an SQL database for example). Each live event may also have a sequence number associated with the live event wherein the sequence number is incremented each time any piece of live data for the associated live event changes, such as shown in FIG. 5B. For example, FIG. 5A shows the data structure 70 before any live event has started and each live event has a sequence number associated with the live event. When a piece of live data 72, such as the visiting team score, changes (as shown in FIG. 5B) for a particular live event, a sequence number 74 for the live event is incremented to the next available sequence number. As shown in FIG. 5C and 5D, when other pieces of live data change for any live event, the sequence number for that live event also is incremented to the next available sequence number.

Using the data structure shown in FIGS. 5A=5D, minimal data must be communicated between each MD and the live data system to determine the live data to send to the particular MD since only the changed live data is sent. The data structure also permits a very simple data request (such as "select SEQ >165" for example) in order to retrieve the most updated pieces of live data for a particular MD.

Figure 6A:
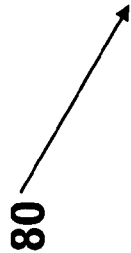
FIGS. 6A-6B illustrate an example of a second embodiment of the live data data structure of the live data versioning system.
Figure 6B:
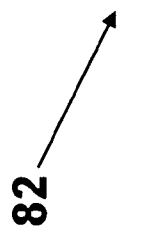
Figure 7:
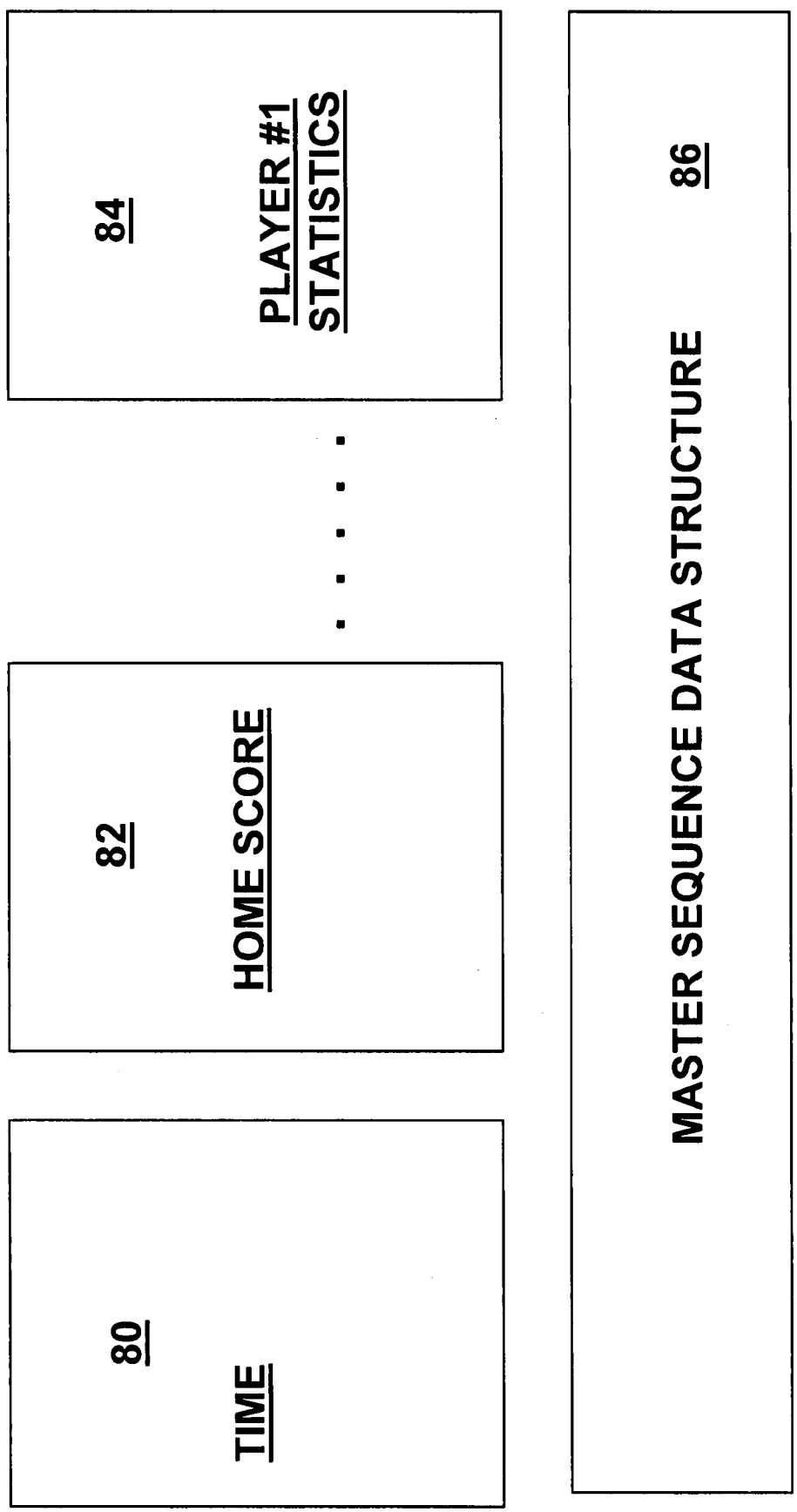
FIG. 7 illustrates more details of an example of the second embodiment of the live data data structure of the live data versioning system.

FIGS. 6A-6B and 7 illustrate an example of a second embodiment of the live data data structure 80, 82, 84, 86 of the live data versioning system. In this embodiment, certain pieces of live data whose values may be frequently changed may be stored in separate data structures 80, 82, such as the time of each live event as shown in FIG. 6A and the home score for each live event as shown in FIG. 6B. When this second embodiment is used, the data structure 70 shown in FIGS. 5A-5D is also used with the home score and time live data removed from the data structure 70. The second embodiment may also include a player #1 statistics data structure 84 that tracks the statistics of a particular player during a live event and is stored in a separate data structure because this information is frequently updated, but is less often viewed by each MD. In this embodiment, there is also a master sequence data structure 86 that, for all of the data structures associated with the display 10, ensures that unique sequence numbers are shared between all of the data structures. This ensures that a simple data request, such as "select SEQ >240" for example, may still be used to retrieve all of the live data that has been changed since the last time the particular MD requested updated data.

FIG. 8 illustrates an example of a third embodiment of a live data data structure 90 of the live data versioning system when it is desirable to maintain a history of the live data changes for the live event, such as player statistics or game statistics or a play by play log for the live events shown in FIG. 1. In this embodiment, each time that a piece of live data is updated, the data structure stores a new record for the particular piece of live data that is updated so that the history of the changes for each piece of live data is maintained as shown in FIG. 8. Thus, for each piece of live data, there are multiple entries in the data structure for that piece of live data unless the piece of live data does not change during the live event.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A mobile device live data versioning system, comprising:
 a live data system;
 a plurality of mobile devices capable of interacting with the live data system over a link; and
 the live data system having a storage unit that stores one or more pieces of live data and a live data unit that tracks the one or more pieces of live data sent to each mobile device, that manages one or more versions of each piece of live data as a managed live data record using a unique sequence number for at least one of said one or more versions and that communicates the pieces of live data to each mobile device based on the unique sequence number.

2. The system of claim 1, wherein each mobile device further comprises a processing unit based device, a personal digital assistant, a mobile phone or a wireless email device.

3. The system of claim 1, wherein the live data system generates a live data application wherein the live data application has one or more live events wherein each live event displays one or more pieces of live data.

4. The system of claim 3, wherein the live data application comprises a sports application and wherein each live event is a game.

5. The system of claim 3, wherein the live data application comprises a financial application and wherein each live event is a stock ticker.

6. The system of claim 3, wherein each mobile device further comprises a processor and an application executed by the processor that displays the live data application.

7. The system of claim 6, wherein the application further comprises a java application.

8. The system of claim 1, wherein the managed live data record further comprises a table.

9. The system of claim 8, wherein the storage unit further comprises an SQL database that stores the one or more pieces of live data and the managed live data table.

10. The system of claim 3, wherein the live data system further comprises a managed live data record for each live event and a master live data record wherein the master live data record records a unique sequence number for each version of each piece of live data in the managed live data records for the live events.

11. The system of claim 1, wherein the link further comprises a wireless link.

12. The system of claim 11, wherein the wireless link further comprises a wireless digital data cellular link.

13. A method for tracking live data versions for a live data system and a plurality of mobile devices capable of interacting with the live data system over a link, the method comprising:
 storing one or more pieces of live data in the live data system;
 tracking the one or more pieces of live data sent to each mobile device;
 managing one or more versions of each piece of live data as a managed live data record including a unique sequence number for at least one of said one or more versions; and
 communicating the pieces of live data to each mobile device based on the unique sequence number.

14. The method of claim 13 further comprising generating a live data application wherein the live data application has one or more live events wherein each live event displays one or more pieces of live data.

15. The method of claim 14, wherein the live data application comprises a sports application and wherein each live event is a game.

16. The method of claim 14, wherein the live data application comprises a financial application and wherein each live event is a stock ticker.

17. The method of claim 14 further comprising executing an application on each mobile device wherein the application displays the live data application.

18. The method of claim 17, wherein the application further comprises a java application.

19. The method of claim 13 further comprising storing the managed live data record in a table in an SQL database.

20. The method of claim 14 further comprising generating a managed live data record for each live event and a master live data record wherein the master live data record records a unique sequence number for each version of each piece of live data in the managed live data records for the live events.

21. A method for tracking live data versions for a live data system and a plurality of mobile devices capable of interacting with the live data system over a wireless link, the method comprising:
 assigning a first unique sequence number to a piece of live data stored in the live data system;
 communicating the piece of live data to a mobile device over the wireless link;
 creating an updated version of said piece of live data within said live data system;
 assigning a second unique sequence number to said updated version of said piece of live data; and
 communicating data associated with said second unique sequence number to said mobile device.

* * * * *